2,647,636

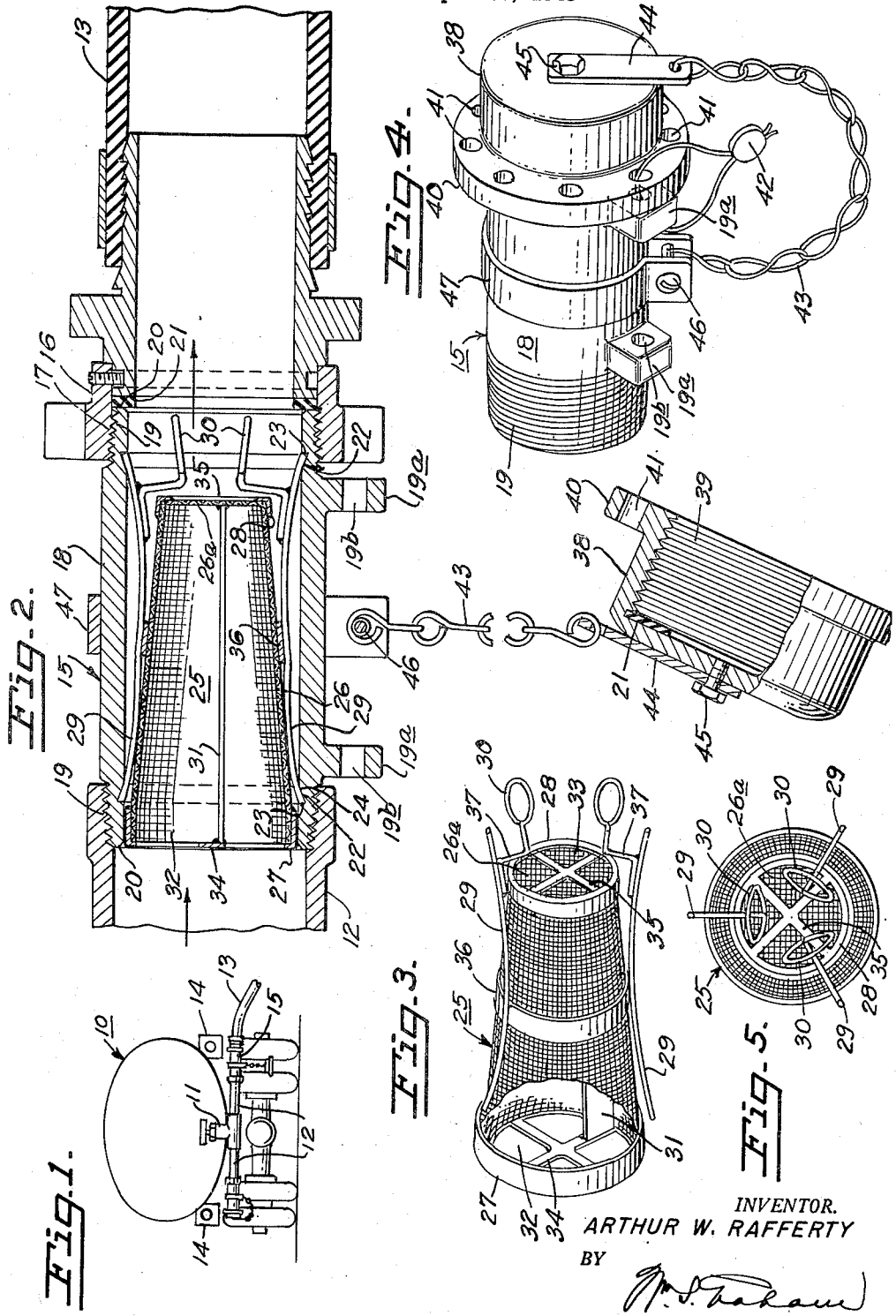
Aug. 4, 1953  A. W. RAFFERTY  2,647,636
UNLOADING HEADER FITTING AND STRAINER
Filed Sept. 21, 1948
INVENTOR.
ARTHUR W. RAFFERTY
BY
ATTORNEY Patented Aug. 4, 1953

UNITED STATES PATENT OFFICE 2,647,636

UNLOADING HEADER FITTING AND STRAINER

Arthur W. Rafferty, Sacramento, Calif.

Application September 21, 1948, Serial No. 50,307

10 Claims. (Cl. 210—164)

1

This invention relates broadly to unloading strainers for liquids, and more particularly relates to fittings and strainers for liquid lines wherein the open or receiving end of the strainer is not normally accessible for manipulation.

In my co-pending application, Serial No. 42,063, filed August 2, 1948, there is provided a strainer apparatus adapted and arranged for insertion at header inlets, and readily removable since the inlet orifice of a liquid line is normally accessible for connection of a filling hose thereto and is equally accessible for removal and cleaning of a strainer. The present invention is to serve a reverse purpose in operation, wherein the liquid line is a discharge line and the open or receiving end of a strainer is positioned towards the pressure flow of liquid within the conveying line. Examples of such use wherein such a strainer finds an advantageous field of use is in the discharge outlet of paint or varnish tanks to remove the characteristic skin which forms on the surface of such product, in tank delivery carriers, such as trucks, railroad tank cars or even tanker ships, and in like environments for discharge of liquids.

If in every instance an efficient strainer header were employed at the head of the receiving line, as disclosed in my said co-pending application, the present invention would be deprived of some of its advantages. The fact is that in practice many receiving lines have no strainer at all; in other instances the strainer is sometimes removed for cleaning and not replaced. Experience has demonstrated that frequently relatively large pieces of foreign matter are found in liquid lines, such as large flakes of rust from the inside of a tank, bolts, nuts, washers, gravel and the like, which have caused great damage to pumps or meters through which the liquid may flow.

Since one of the advantageous uses of the invention is in connection with the outlet unloading line of a transport tank truck, the invention is herein described and illustrated in that environment.

Among the objects of the invention are to provide a removable strainer for unloading lines for liquid, in which the open end of the strainer is positioned toward the direction of pressure flow of the liquid.

Another object is to provide means to removably secure a strainer in a liquid line.

A further object is to provide means of a reversible strainer fitting member for unloading liquid in a flow line.

A still further object is to provide an unloading header fitting for supporting therein a strainer against flow of liquid.

Yet another object is to provide a strainer assembly for unloading headers simple in construction, economical in production, and efficient in operation, and to improve generally upon strainer devices of the character described.

With the foregoing and other objects in view which will be apparent from or further explained in this specification, one form in which the invention may be embodied is described herein and illustrated in the accompanying drawing, it being understood that variations of details may be resorted to by substitution of equivalents without departing from the spirit of the invention defined in the appended claims.

In the accompanying drawing:

Fig. 1 is a rear view of a transport tank truck, reduced in size relative to the other figures, showing one environment of installation of the invention.

Fig. 2 is a central longitudinal section of the invention, connected to a hose member.

Fig. 3 is a perspective view partly broken away of the strainer cup member.

Fig. 4 is a perspective view of nipple member and closure cap mounted thereon.

Fig. 5 is a bottom view of a modified form of the strainer cup of the invention.

Referring to the accompanying drawing in which like reference characters indicate corresponding parts in the several views, and in order to illustrate one environment of use of the invention, 10 indicates a transport tank truck at the rear of which is provided a suitable outlet controlled by a valve 11. The outlet may have one or more discharge pipes 12, and in the example illustrated is provided with two which are usual in transport tank trucks so that liquid may be discharged with facility at either side of the truck or from both sides simultaneously. Normally a flexible hose 13 is connected to one of the outlet ends of the discharge pipe, hoses of varying standard sizes being the usual equipment of such truck and are carried by the truck in elongated boxes 14.

The present invention contemplates a fitting generally indicated 15 mounted at the end of each of the discharge pipes to which the flexible discharge hose 13 is threadedly connected by suitable coupling 16 which is complementally threaded as at 17 for such connection to the fitting.

The fitting includes a tubular elongated nipple 18 threaded externally at each its opposite end portions preferably with the usual tapered thread 19, and having smoothly machined face ends 20 for seating with tight leak-proof fit against a suitable gasket 21 which may be provided in any connecting or capping member.

Adjacent the inner ends of the threads of the nipple there is provided a locking lug 19a having a hole 19b therethrough to be further described.

Internally, the nipple is provided with inwardly opening recesses which may be annular grooves 22 spaced from each its ends. Each groove has its wall 23 which is more nearly adjacent the nipple end substantially perpendicular or radial to the axis of the nipple, and has its other wall 24 tapered toward the longitudinal center of the nipple, the grooves being for receiving opposite ends of spring members of a strainer as hereinafter described.

A strainer member generally indicated 25 is adapted and arranged for mounting within the nipple 15, comprising a strainer cup 26 with reinforcing rings 27, 28 at opposite ends, bowed spacer spring bars 29 with finger grips 30 at one end portion, and optionally, a baffle wall 31.

The strainer cup 26 is preferably tapered as a conical frustum of reticulated wire mesh, though it may also be molded plastic or the like, and is tapered from its open receiving end 32 toward its opposite or discharge end 33, the open receiving end having the greater diameter and the opposite end being closed by a mesh liquid strainer wall 26a.

The annular reinforcing collar or ring 27 is positioned circumferentially of the open receiving end of the wire mesh body and is of a diameter substantially equal to the diameter of the nipple so as to be received loosely slidably in close contact with the internal wall at one end of the nipple. The ring 27 is preferably provided with relatively perpendicular cross-bars 34 for transverse reinforcement and also serves to prevent any relatively large or heavy pieces of foreign matter from entering the strainer cup and possibly damaging the wire mesh. The reinforcing annular ring 28 at the opposite end of the strainer cup may be welded or soldered circumferentially of the smaller end of the strainer cup, and likewise have crossbars 35 for reinforcing the mesh bottom of the cup.

The spring bar members, of which there are preferably at least two spaced respectively at opposite sides of the cup, are arcuately bowed, the longitudinal central portion of the back of the bow being fixedly connected to an annular band 36 exteriorly circumferential of the longitudinal central portion of the body of mesh cup 15, the opposite ends of the bow springs being free and spaced from the mesh cup by the diverging bow of the springs. The length of the bow spring is equal to the distance between the internal grooves 22 of the nipple and the end of the springs are adapted to snap into said grooves when the strainer cup is inserted in the nipple. The spacer spring bars 29 serve to support the strainer cup with the nipple and space the tapered mesh wall of the cup from the internal wall of the nipple, except at the portion closely adjacent to the open or receiving end of the cup.

The finger grip members 30 are attached to the springs at the end portion of the springs adjacent the bottom or the mesh-closed end of the cup. Suitable extension arms 37 are employed to space the finger grip portions radially inwardly from the ends of the springs and consequently from the walls of the nipple when the cup is inserted therein, the grip portion being illustrated as relatively opposed and spaced loops formed integrally with the extension arms, the loops and extension arms being of such length and dimension that the loops may lie entirely within the nipple and be accessible for manually gripping through the open end of the nipple and pressing towards each other for releasing the spring members connected thereto from their seat in the adjacent recessed groove of the nipple.

It is also desirable that a convenient cap closure member be provided for the fitting to prevent removal of the strainer and also to prevent foreign matter from entering during transit, as well as providing means for locking the discharge pipe of a truck such as when the truck is parked upon the highway or unattended by its operator. For this purpose novel means are also provided for securing the cap to the nipple fittings.

The cap closure 38 is of the recess type threaded internally as at 39 complementally to the threads of the nipple. The cap gasket 21 fits flatly and snugly in the bottom of the recess for sealing against the finely machined end edge face of the nipple. Extended radially outwardly from the circumference of the cap is a flange 40 having a plurality of circumferentially spaced holes 41 therethrough so that when the cap is seated on the nipple, one of such holes will overlie the hole 19b in the locking lug 19a, and any suitable locking means such as strap seal 42 may be inserted through registering holes.

In order that the cap may not become lost or misplaced it is attached to the nipple by a chain 43 and a link bar 44, the latter having freely rotatable connection to a pin 45 mounted in the top of the cap, so that the cap may be rotated for mounting and demounting on the nipple without twisting rotation of the chain. The opposite end of the chain is connected to a bolt 46 mounted through flanges of a band 47 secured around the central portion of the nipple.

The modification of Fig. 5 discloses a structure of the strainer cup which may be similar to that hereinabove described, except that the strainer cup of the modification provides for employment of three spring members 29 and three finger-grip loops, which will be found advantageous in strainers of comparatively large sizes.

It will be noted that the nipple is similarly formed at each opposite end and particularly that the grooves 22 are respectively equally spaced from the opposite ends of the nipple. Such similarity of the opposite ends of the nipple permits reversal of ends thereof if the more frequently used cap-end should become worn or deformed sufficiently to interfere with its use as the discharge end of the nipple.

As stated in the purposes of the invention, the strainer of the present invention is especially adapted for an unloading fitting. Therefore, the larger open end of the strainer is toward the direction from which the liquid flows, that is, the open end faces upstream, as shown by the arrows indicating the direction of liquid flow in Fig. 2. In operation a nipple 15 is threadedly mounted at each of the discharge ends of the unloading pipe 12 of the tank carrier. The strainer cup may then be inserted in the nipple from the free open discharge end, which may be readily accomplished by manually forming inwardly the ends of the bow springs adjacent the open end of the strainer cup and sliding the cup into the nipple until the relatively opposite ends of the bow spring seat by resilient snap in the grooves 22 responsive to the inherent radially outward tension of the ends of the bow springs. When thus seated, the ends of the springs removably lock against the perpendicular groove walls 23 and stabilize the cup against moving in either direction, so that it cannot be inadvertently pressed beyond the nipple and into the discharge pipe and cannot be pressed outwardly beyond the nipple by the fluid pressure and thereby digested into the flexible connected hose. Yet, when it is desired to remove the strainer cup for cleaning or replacement, it is only necessary to press the finger grip together, which releases the most nearly adjacent spring ends from engagement from the perpendicular wall and the recessed groove, whereupon the strainer cup may be withdrawn from the nipple. The opposite ends of the bow springs will easily slide up the incline of the wall of its groove and will readily ride past the other groove due to the inward resilience of the spring.

Obviously, in practical application, the strainer cup will have the diameter of its larger open end substantially equal to the internal diameter of the nipple, allowance being made for slidable clearance. From the diameter of the open end, the cup tapers as a conical frustum so that the remainder of its length is increasingly spaced from the inner wall of the nipple, thus affording large strainer area of mesh side wall through which liquid may pass, and thus removing from the mesh end wall a substantial amount of pressure from velocity of the flowing liquid.

Any large objects of foreign matter in the liquid will be intercepted by the reinforcing crossbars 34 at the open end of the strainer and thus avoid damage to the mesh wall. Manifestly, smaller particles of foreign matter will be intercepted by the mesh of the filter and may be removed from the strainer cup by removing the cup responsive to release of the spring engagement by pressure on the finger grips, whereupon the strainer may be replaced for repeated strainer operation in the manner previously described. Where the longitudinal baffle wall 31 is optionally employed, its purpose is to decrease the tendency of the liquid under head pressure from spiraling into a funnel as is characteristic in such cases, and thus to decrease the force of flow, and yet by preventing a funneling effect, the volume of liquid flow is not substantially decreased.

Having thus described the invention, I claim:

1. In a device for unloading header fittings, a tubular nipple which is internally recessed adjacent its opposite ends, a frusto-conical strainer cup member comprising a strainer cup having a collar ring at an open end seated slidably closely within the internally recessed tubular nipple, and resilient spring means adjacent each of the opposite ends exterior of the cup, the resilient spring means having endmost free portions seated within the internal recesses of the nipple, whereby the cap may be stayed against movement in either direction axially of the tubular nipple.

2. In a strainer device for unloading header fittings, a tubular nipple which is internally recessed adjacent its opposite ends, a conically tapered strainer cup having a collar ring at an open end seated slidably closely within the nipple, a plurality of elongated springs connected centrally of their ends exterior of the longitudinally central portion of the cup and having free ends which extend radially outward from said central mounting and toward an end of the tapered cup, said free ends being seated releasably in the internal recesses of the nipple.

3. In a device for unloading header fittings, a nipple which has internal recessed seats relatively spaced longitudinally adjacent its opposite ends, a strainer device comprising a conically tapered strainer cup having a collar ring at an open end seated slidably closely within the nipple, resilient spring means secured to the exterior of the cup intermediate the cup ends and having opposite ends free, said free ends being seated releasably in the recessed seats in the nipple, and finger grip members extended beyond the smaller end of the tapered cup arranged and adapted for releasing the spring means from the seats in the nipple.

4. In a strainer device for unloading header fittings, a nipple provided with internal recessed seats relatively spaced longitudinally adjacent its opposite ends, a strainer cup having an open end seated slidably closely within the nipple, resilient spring means at opposite ends exterior of the cup, said spring means having full ends seated in the spaced recessed seats in the nipple, and finger grip members extending beyond one end of the cup adapted and aranged for releasing the spring means from the recessed seats.

5. In a strainer device for unloading header fittings, the combination of a tubular nipple having an externally threaded end portion, said nipple having an inwardly open internal recess adjacent an end arranged for releasably engaging spring means of a strainer cup against movement of the cup in one direction axially of the nipple, a tapered strainer cup having a reinforcing ring at its larger open end seated slidably closely within the nipple, and resilient spring means exterior of the opposite smaller end of the cup said spring means having endmost free portions seated in said recess in the nipple.

6. An unloader header fitting and strainer comprising the combination of a tubular nipple having an externally threaded end, said nipple having an inwardly open internal recess adjacent an end arranged for releasably engaging spring means of a strainer cup against movement of the cup in one direction axially of the nipple, a strainer cup having an open end seated slidably closely within the nipple, resilient spring means exterior of the opposite end of the cup, said spring means having endmost free portions seated in said recess of the nipple, and finger grip members extending from said last mentioned end of the cup adapted and arranged for releasing the resilient spring means from said recess.

7. An unloader header fitting and strainer comprising a tubular nipple having an externally threaded open end, said nipple having an internal recess adjacent an end arranged for releasably engaging spring means of a strainer cup against movement of the cup in one direction axially of the nipple, a conically tapered strainer cup having an open end of greater diameter seated slidably closely within the nipple, resilient spring means exterior of the smaller opposite end of the cup, said spring means having endmost free portions seated in said recess, and finger grip members extending beyond the smaller end of the tapered cup arranged and adapted for manual engagement through the open end of the tubular nipple for releasing the spring means from the recess in the nipple.

8. In a strainer device of the character described, a tubular nipple having externally threaded opposite ends, said nipple having an inwardly open internal recess adjacent each of its opposite ends arranged for engaging spring means of a strainer cup against movement of the cup axially of the nipple, a conically tapered strainer cup having an open end of greater diameter seated slidably closely within the nipple, spring means at opposite ends exterior of the cup, said spring means having endmost free portions seated in said recesses, and finger grip members extending from the smaller end of the cup adapted and arranged for releasing the spring means from the recesses.

9. In an unloader header fitting and strainer, a tubular nipple having externally threaded opposite ends, said nipple having an inwardly open internal recess adjacent each of its opposite ends arranged for engaging spring means of a strainer cup against movement of the cup axially of the nipple, a conically tapered strainer cup having a reinforcing ring at its larger open end seated slidably closely within the nipple, elongated bow spring means connected centrally of the cup ends exterior of the cup and having opposite ends free, said free ends being seated in the spaced recesses in the nipple, and finger grip members extending from the smaller end of the tapered cup arranged and adapted for releasing the spring means from engagement in recesses in the nipple.

10. A strainer device for seating releasably against longitudinal movement within a tubular nipple casing which is provided with grooves relatively spaced longitudinally therein, and adjacently spaced from each opposite end of the nipple, said strainer device comprising a frustum tapered strainer cup open at its end of greater diameter, longitudinally disposed resilient spring bars mounted exteriorly of the cup, said spring bars having free portions extending longitudinally of the cup and having endmost portions relatively diverging from the cup at each opposite end of the cup for releasably seating in the grooves of the nipple, and finger grip members connected to the end portion of the spring bars adjacent one end of the tapered cup and extending beyond said end of the cup, said finger grip members having extension arms spacing them radially inwardly from the end portions of the spring members to which they are connected whereby the finger grip members are spaced from the nipple wall when the adjacent ends of the springs are in a groove of the nipple, said extension arms being of a length to space the finger grip members relatively whereby they and the spring members to which they are connected may be pressed towards each other for releasing the adjacent ends of the springs from their seat in the groove of the nipple.

ARTHUR W. RAFFERTY.

References Cited in the file of this patent

UNITED STATES PATENTS

| Number | Name | Date |
|---|---|---|
| 540,274 | Schone | June 4, 1895 |
| 751,918 | Jagger | Feb. 9, 1904 |
| 2,281,448 | Mathey | Apr. 28, 1942 |
| 2,326,903 | Tinnerman | Aug. 17, 1943 |
| 2,464,579 | Hovanian | Mar. 15, 1949 |

FOREIGN PATENTS

| Number | Country | Date |
|---|---|---|
| 507,459 | France | of 1920 |
| 375,013 | Great Britain | June 23, 1932 |
| 358,115 | Italy | of 1938 |